(12) United States Patent
Magnin et al.

(10) Patent No.: US 9,709,140 B2
(45) Date of Patent: *Jul. 18, 2017

(54) ROLLER SCREW, MOUNTING METHOD AND TOOL FOR FITTING ROLLERS IN SUCH A ROLLER SCREW

(71) Applicant: AKTIEBOLAGET SKF, Gothenburg (SE)

(72) Inventors: Christophe Magnin, Albens (FR); David Richardet, Viviers-du-Lac (FR)

(73) Assignee: AKTIEBOLAGET SKF, Gothenburg (SE)

(*) Notice: Subject to any disclaimer, the term of this patent is extended or adjusted under 35 U.S.C. 154(b) by 231 days.

This patent is subject to a terminal disclaimer.

(21) Appl. No.: 14/620,934

(22) Filed: Feb. 12, 2015

(65) Prior Publication Data

US 2015/0233456 A1 Aug. 20, 2015

(30) Foreign Application Priority Data

Feb. 14, 2014 (FR) ..................................... 14 51201

(51) Int. Cl.
*F16H 25/22* (2006.01)
*F16H 57/02* (2012.01)
(Continued)

(52) U.S. Cl.
CPC ....... *F16H 25/2252* (2013.01); *F16H 57/023* (2013.01); *F16H 57/02004* (2013.01);
(Continued)

(58) Field of Classification Search
None
See application file for complete search history.

(56) References Cited

U.S. PATENT DOCUMENTS

| 4,526,053 A * | 7/1985 | Carson | F16H 25/2252 |
| | | | 74/424.75 |
| 2004/0031341 A1 * | 2/2004 | Benoit | F16H 25/2252 |
| | | | 74/89.34 |

(Continued)

FOREIGN PATENT DOCUMENTS

| EP | 1918612 A1 | 5/2008 |
| JP | 2007057026 A | 3/2007 |

(Continued)

*Primary Examiner* — Justin Holmes
(74) *Attorney, Agent, or Firm* — Bryan Peckjian; SKF USA Inc. Patent Dept.

(57) ABSTRACT

A roller screw mechanism comprising a screw having an outer threading; a nut arranged around and coaxially to the screw, the nut having an inner threading; and a plurality of mutually identical rollers interposed between the screw and the nut. Each mutually identical roller having an outer threading engaged with the outer and inner threadings of the screw and of the nut. The threading of each mutually identical roller being prolonged axially at each end by teeth respectively engaged with teeth of two annular crown rings fixed in an unthreaded part of the bore of the nut. Each of the mutually identical rollers comprises an angular visual positioning feature. The nut comprises an angular visual positioning feature making it possible to angularly place the rollers in the crown ring.

11 Claims, 7 Drawing Sheets

(51) Int. Cl.
*F16H 57/023* (2012.01)
*F16H 57/00* (2012.01)
(52) U.S. Cl.
CPC . *F16H 2057/0056* (2013.01); *Y10T 29/49547* (2015.01); *Y10T 29/53104* (2015.01)

(56) References Cited

U.S. PATENT DOCUMENTS

| | | | | |
|---|---|---|---|---|
| 2004/0244520 | A1* | 12/2004 | Cornelius | F16H 25/2252 74/424.92 |
| 2005/0160856 | A1* | 7/2005 | Sugitani | F16H 25/2252 74/424.92 |
| 2007/0249453 | A1* | 10/2007 | Sugitani | B62D 3/02 475/4 |
| 2010/0269616 | A1* | 10/2010 | Merlet | F16H 57/0497 74/424.92 |

FOREIGN PATENT DOCUMENTS

| | | |
|---|---|---|
| JP | 2007064444 A | 3/2007 |
| JP | 2010038188 A | 2/2010 |

\* cited by examiner

ROLLER SCREW, MOUNTING METHOD AND TOOL FOR FITTING ROLLERS IN SUCH A ROLLER SCREW

CROSS REFERENCE TO RELATED APPLICATION

This is a National Stage application claiming the benefit of France Patent Application Number 1451201 filed on 14 Feb. 2014 (Feb. 14, 2014), which is incorporated herein by reference in its entirety.

FIELD OF THE INVENTION

The present invention relates to the field of roller screw mechanisms that make it possible to convert a rotational movement into a linear translational movement, and vice versa. Such a mechanism is provided with a screw having an outer threading, a nut arranged around the screw and having an inner threading and a plurality of longitudinal rollers engaged respectively with the outer and inner threadings of the screw and of the nut.

SUMMARY OF THE INVENTION

A first type of roller screw mechanism comprises rollers having an outer threading engaged with the outer and inner threadings of the screw and of the nut. The threadings of the rollers and the threading of the nut exhibit mutually identical helix angles different from that of the threading of the screw, such that, when the screw turns relative to the nut, the rollers turn on themselves and roll around the screw without being displaced axially within the nut. The rollers are guided in rotation parallel to the axis of the screw by teeth mounted on the nut and engaged with teeth of the rollers. Such a mechanism is called satellite roller screw.

A second type of roller screw mechanism has a similar operating principle but is differentiated by a reversed position. The helix angles of the threadings of the rollers, of the screw and of the nut are chosen such that, when the screw turns relative to the nut, the rollers turn on themselves around the screw and are displaced axially in the nut. The rollers are guided in rotation parallel to the axis of the screw by teeth formed thereon and cooperating with teeth of the rollers. Such a mechanism is called inverted satellite roller screw.

To fit the rollers in the roller screw mechanism, the rollers are fitted one by one manually and with extreme care until the start of the threads is arranged at the right point.

However, the rollers must be positioned in the nut in such a way as to have the same axial position. In effect, when the roller is fitted in the nut in the known manner, the teeth of the roller mesh with the crown ring and the journals are positioned in a void of the annular rings. If the axial position of the roller is not right, that is to say that the roller is not in the axis of the nut, then there is a radial slack between the teeth of the roller and the crown rings.

The aim of the present invention is therefore to resolve these drawbacks by proposing a roller screw mechanism of simple design and that is easy to fit, while minimizing the radial slack between the teeth of the roller and the crown rings.

The subject of the invention is a roller screw mechanism comprising a screw having an outer threading, a nut arranged around and coaxially to the screw, the nut having an inner threading, and a plurality of mutually identical rollers interposed between the screw and the nut and each having an outer threading engaged with the outer and inner threadings of the screw and of the nut. The threading of each roller is prolonged axially at each end by teeth which are themselves prolonged axially by a cylindrical journal extending outwards. The roller screw mechanism further comprises two annular crown rings fixed in an unthreaded part of the bore of the nut and each internally comprising teeth respectively engaged with the teeth of the rollers and two annular rings each fitted radially between the screw and the associated crown ring and comprising a plurality of cylindrical through voids distributed evenly in the circumferential direction and inside which the journals of the rollers are housed.

Each of the rollers comprises an angular visual positioning feature and the nut comprises an angular visual positioning feature making it possible to angularly place the rollers in the crown ring. The angular visual positioning feature of the rollers must be situated at the same point for each of the rollers, for example at the start of the thread.

Advantageously, the angular visual positioning feature of the rollers is produced outside the threading.

According to one embodiment, the angular visual positioning feature of the rollers is produced one of the lateral radial surface or the cylindrical axial surface of one of the sets of teeth.

According to one embodiment, the angular visual positioning feature of the rollers is produced on one of the lateral radial surface or the cylindrical axial surface of one of the journals.

According to one embodiment, the angular visual positioning feature is one of a deformation, a machining or a marking.

According to one embodiment, the angular visual positioning feature of the rollers is produced before the threading of the roller.

According to a second aspect, the invention relates to a fitting tool capable of fitting rollers in a roller screw mechanism described previously. The fitting tool comprises an annular body having a cylindrical through piercing having an inner diameter greater than the outer diameter of the nut and a plurality of cylindrical through voids distributed evenly in the circumferential direction and each having an angular visual positioning feature for each of the rollers. The fitting tool comprises, on its cylindrical piercing, a notch intended to cooperate with a ridge of the nut in order to angularly position the tool relative to the nut.

According to a third aspect, the invention relates to a method for fitting rollers in a roller screw mechanism described previously, in which a first roller is positioned in the associated void of one of the annular rings so that the angular visual positioning feature of the first roller is aligned with the angular visual positioning feature of the nut; and the first roller is made to turn on itself until the adjacent void formed in the annular ring is level with the angular visual positioning feature of the nut.

In one embodiment, a second roller is positioned in the associated void of the annular ring so that the angular visual positioning feature of the second roller is aligned with the angular visual positioning feature of the nut; and the second roller is made to turn on itself until the adjacent void formed in the annular ring is level with the angular visual positioning feature of the nut and the step of placement and rotation is repeated for each of the rollers.

After having fitted the first roller in the crown ring, the fitting tool can be positioned around the nut in such a way that the notch cooperates with the ridge of the nut and all the other rollers are positioned in the angular positions corresponding to the angular positions of the angular visual positioning feature of the fitting tool. Thus, all the angular visual positioning feature, respectively of the first roller, of the nut and of the first cylindrical void of the fitting tool are aligned.

BRIEF DESCRIPTION OF THE DRAWINGS

The present invention will be better understood on studying the detailed description of embodiments taken as non-limiting examples and illustrated by the attached drawings in which.

DETAILED DESCRIPTION OF EXEMPLARY EMBODIMENTS OF THE INVENTION

Figure 1:
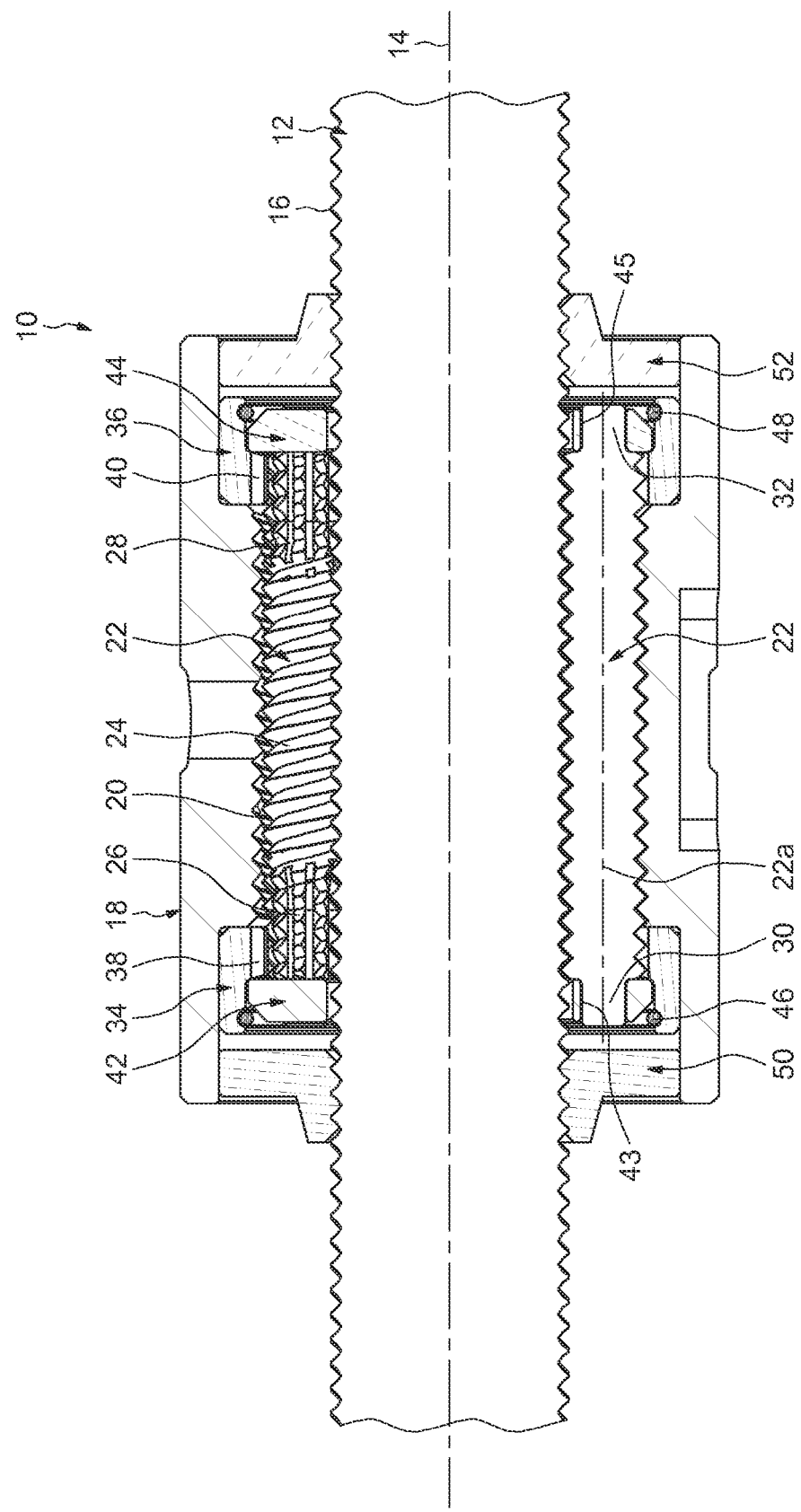
FIG. 1 is a partial view in axial cross section of a roller screw mechanism according to one embodiment of the invention.

As illustrated in the figures, a roller screw mechanism, referenced 10 as a whole, comprises a screw 12, of axis 14, provided with an outer threading 16, a nut 18 fitted coaxially around the screw 12 and provided with an inner threading 20, and a plurality of longitudinal rollers 22 arranged radially between the screw 12 and the nut 18. The inner threading 20 of the nut 18 has an inner diameter which is greater than the outer diameter of the outer threading 16 of the screw 12. The screw 12 extends longitudinally through a cylindrical bore (not referenced) of the nut 18 on which the inner threading 20 is formed.

The rollers 22, n in number, are mutually identical and distributed evenly around the screw 12. Each roller 22 extends along an axis 22a coaxial to the axis 14 of the screw 12 and comprises an outer threading 24 engaged with the threading 16 of the screw 12 and the threading 20 of the nut 18. The threading 24 of each roller is prolonged axially at each end by teeth 26, 28 which are themselves prolonged axially by a cylindrical journal 30, 32 extending outwards.

The roller screw mechanism 10 comprises two annular crown rings 34, 36 fixed in an unthreaded part of the bore of the nut 18 and each comprising, internally, teeth 38, 40 respectively engaged with the teeth 26, 28 of the rollers 22 for their synchronization.

The roller screw mechanism 10 also comprises two annular rings 42, 44 each fitted radially between the threading 16 of the screw 12 and the associated crown ring 34, 36. Each annular ring 42, 44 comprises a plurality of cylindrical through voids 42a, 44a distributed evenly in the circumferential direction and inside which the journals 30, 32 of the rollers 22 are housed. The annular rings 42, 44 make it possible to bear the rollers 22 and maintain a regular circumferential spacing of the rollers.

As illustrated, the roller screw mechanism 10 also comprises retaining rings 46, 48 fitted in a groove (not referenced) provided in the bore of the associated crown ring 34, 36 and designed to secure the corresponding ring 42, 44 axially, and two end caps 50, 52 fixed in the bore of the nut in the vicinity of the rings 42, 44. The caps 50, 52 axially block the bore of the nut 18 and each have a threading (not referenced) cooperating with the threading 16 of the screw 12.

The threadings 24 of the rollers 22 and the threading 20 of the nut 18 have mutually identical helix angles different from that of the threading 16 of the screw 12, such that, when the screw 12 turns relative to the nut 18, the rollers 22 turn on themselves and roll around the screw 12 without being displaced axially within the nut 18. The rollers 22 are guided in rotation parallel to the axis 4 by the teeth 38, 40 of the crown rings 34, 36. The screw 12 can move axially or longitudinally relative to the rollers 22.

Figure 2:
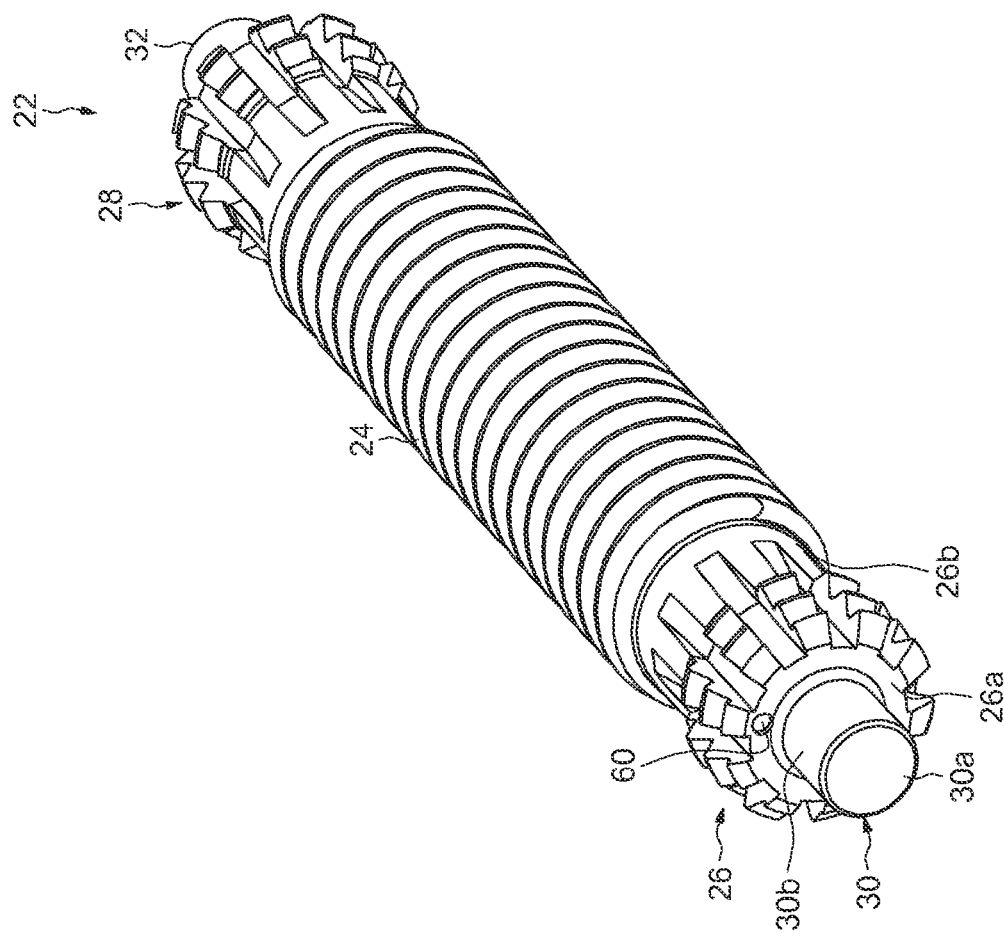
FIG. 2 is a perspective view of a roller according to a first embodiment of the invention.

As illustrated in FIG. 2, each of the rollers 22 comprises an angular visual positioning feature 60 making it possible to place the rollers 22 in the crown rings 34, 36 relative to a predetermined reference point of one of the crown rings 34. The angular visual positioning feature 60 is produced outside the threading 24, on the lateral radial surface 26a of one of the sets of teeth 26 of the roller 22. The angular visual positioning feature 60 can be produced before the threading of the roller 22.

As illustrated in FIG. 2, the angular visual positioning feature 60 is produced by machining a rounded form. As a variant, provision could be made for the angular visual positioning feature 60 to be a deformation or a marking, such as, for example, paint. It will be noted that any other form could be provided for the angular visual positioning feature 60.

Figure 3:
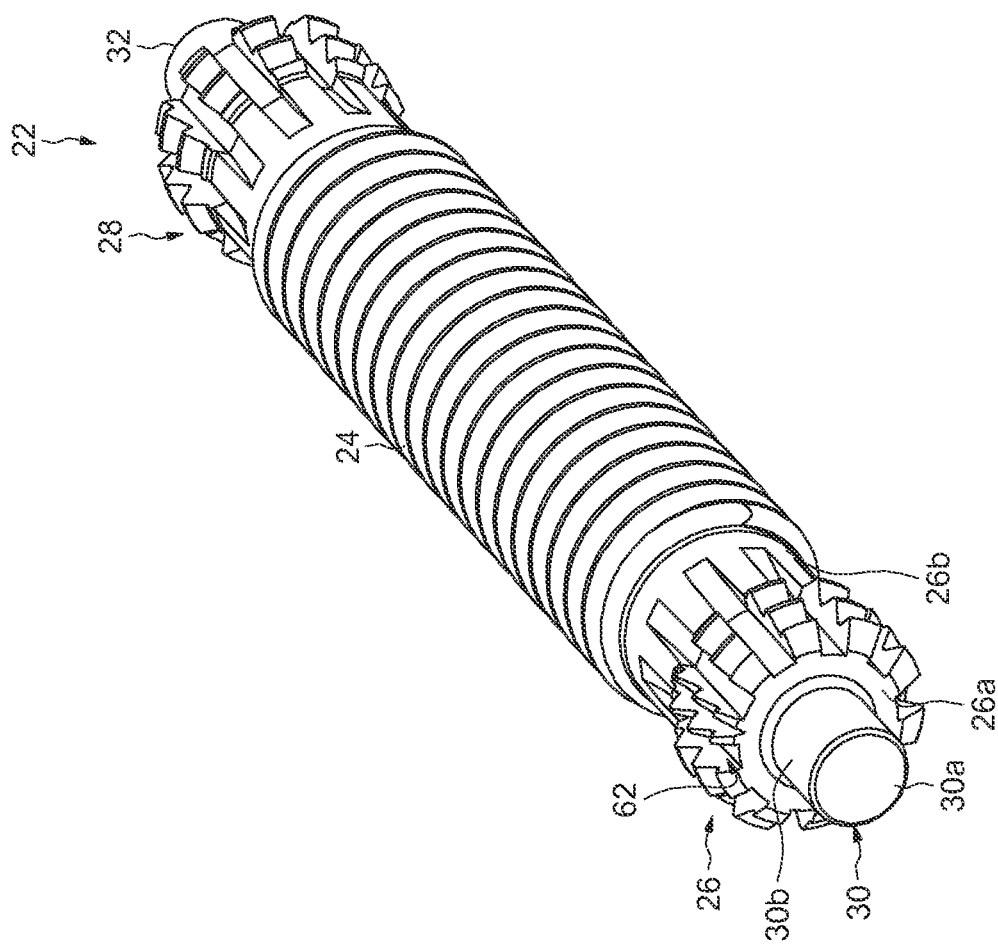
FIG. 3 is a perspective view of a roller according to a second embodiment of the invention.

The embodiment illustrated in FIG. 3, in which the identical elements bear the same references, differs from the embodiment illustrated in FIG. 2 only by the position of the angular visual positioning feature. As illustrated in FIG. 3, each of the rollers 22 comprises an angular visual positioning feature 62 produced outside the threading 24, on the axial cylindrical surface 26b of one of the sets of teeth 26 of the roller 22 and is prolonged on the radial lateral surface 26a of the teeth 26. It is in fact possible to have a triangular form appear on the radial lateral surface 26a of the teeth 26.

As illustrated in FIG. 3, the angular visual positioning feature 62 is a machining produced before the threading of the roller 22. As a variant, provision could be made for the angular visual positioning feature 62 to be a deformation or a marking.

As a variant, provision could be made for the angular visual positioning feature 60, 62 to be produced on one of the lateral radial surface 30a or the cylindrical axial surface 30b of one of the journals 30.

Figure 4:
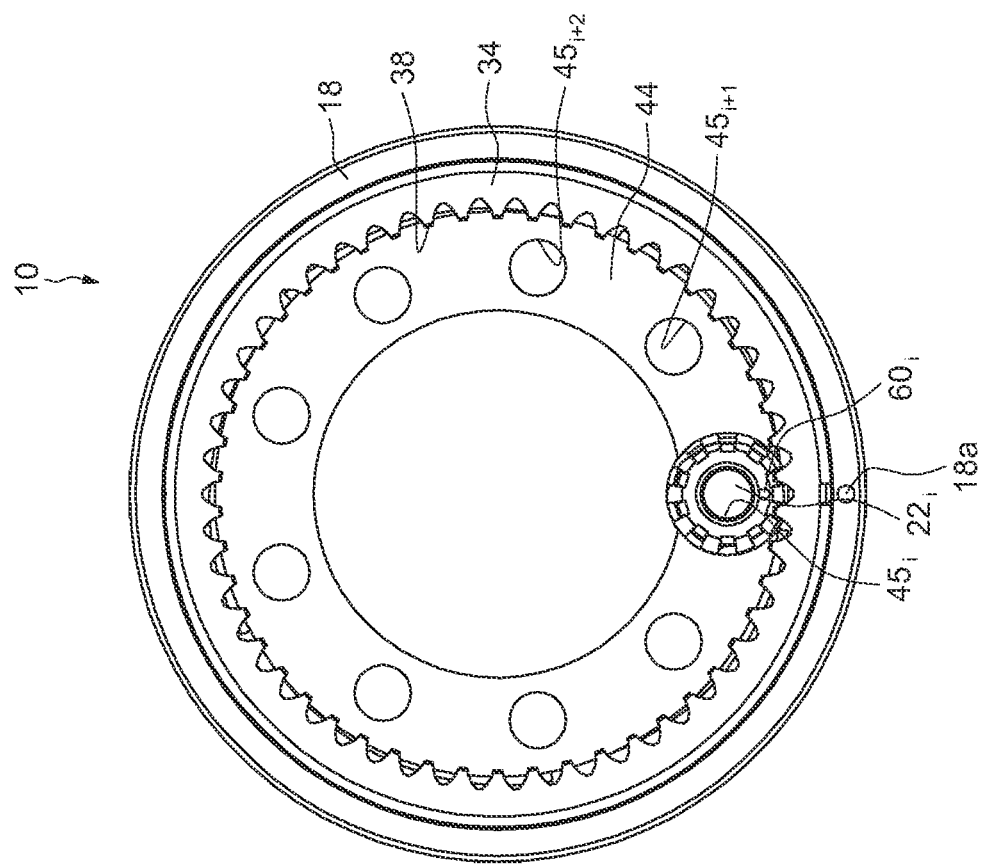
FIGS. 4, 5 and 6 illustrate the steps of the method for fitting rollers in the roller screw mechanism of FIG. 1.
Figure 5:
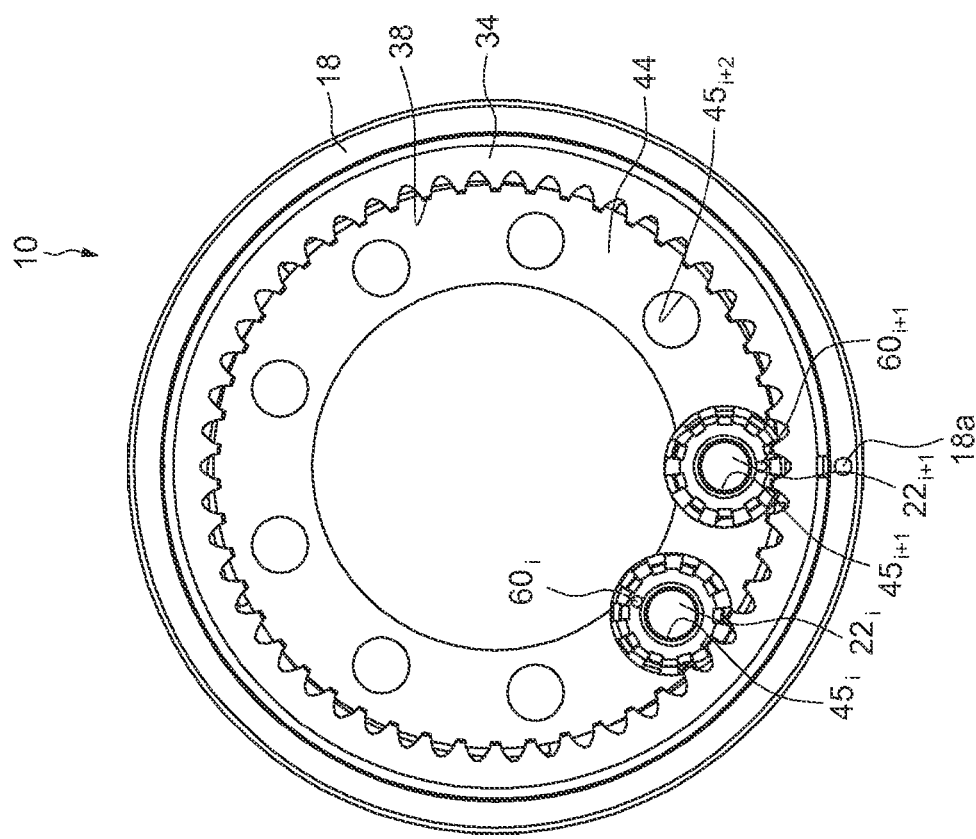
Figure 6:
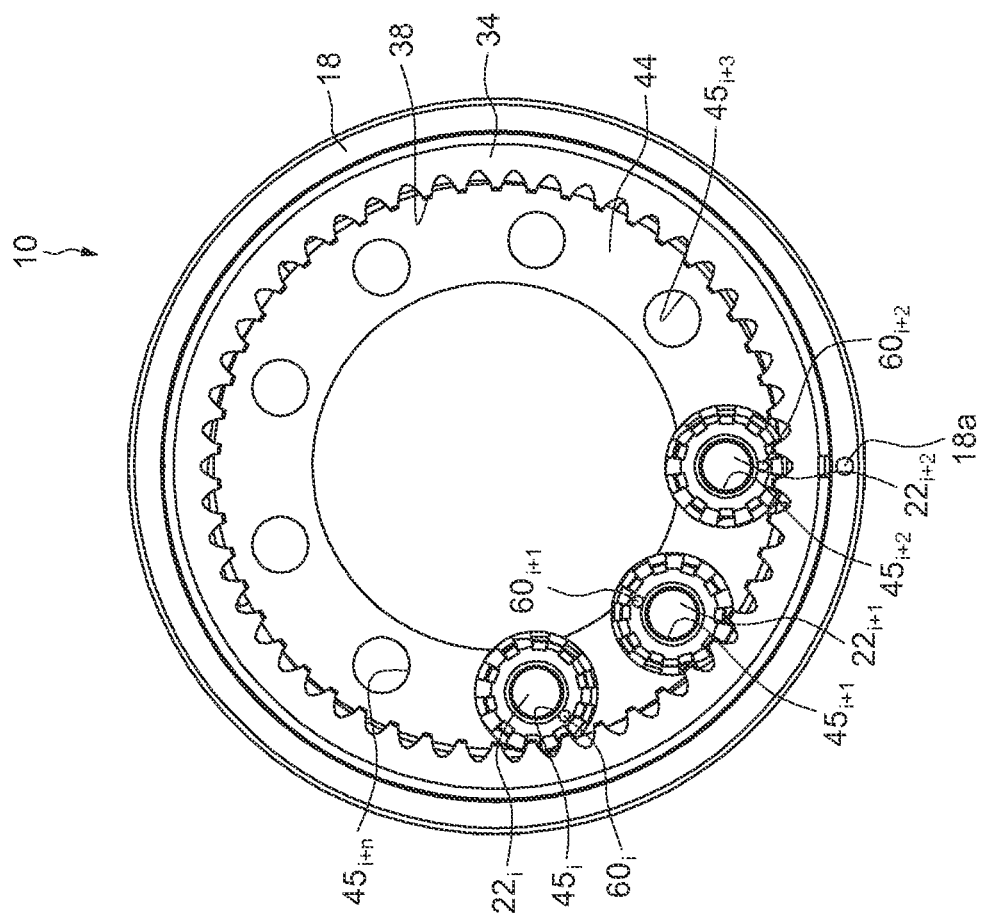

As illustrated in FIGS. 4 to 6, the nut comprises an angular visual positioning feature 18a making it possible to place the rollers 22 angularly in the crown rings 34, 36. The angular visual positioning feature 18a of the nut 18 is produced on the lateral radial surface (not referenced) of the nut 18. As illustrated in FIGS. 4 to 6, the angular visual positioning feature 18a of the nut 18 is produced by machining a rounded form. As a variant, provision could be made for the angular visual positioning feature 18a of the nut 18 to be a deformation or a marking, such as, for example, paint. It will be noted that any other form could be provided for the angular visual positioning feature 18a of the nut 18.

The rollers 22 are fitted in the nut 18 as follows with reference to FIGS. 4 to 6:

A first roller 22i is positioned manually or automatically in the associated void 45i of the annular ring referenced 44 so that the angular visual positioning feature 60i of the first roller 22i is facing the angular visual positioning feature 18a of the nut 18, for example aligned and radially directed outwards, i being the number of rollers 22 and of voids 45, between 1 and n. As illustrated in the figures, the number n is equal to eight. As a variant, a number n greater than or less than eight could be provided.

The first roller 22*i* is then manually made to turn on itself so that it is displaced radially in the crown ring 34 until the adjacent void 45*i*+1 formed in the annular ring 44 is level with the angular visual positioning feature 18*a* of the nut 18.

As illustrated in FIG. 5, a second roller 22*i*+1 is positioned in the associated void 45*i*+1 of the annular ring 44 so that the angular visual positioning feature 60*i*+1 of the second roller 22*i*+1 is facing the angular visual positioning feature 18*a* of the nut 18, for example aligned and radially directed outwards, as can be seen in FIG. 5.

As illustrated in FIG. 6, the second roller 22*i*+1 is made to turn on itself in such a way that it is displaced radially in the crown ring 34 until the adjacent void 45*i*+2 formed in the annular ring 44 is level with the angular visual positioning feature 18*a* of the nut 18 and a third roller 22*i*+2 is positioned in the associated void 45*i*+2 of the annular ring 44 so that the angular visual positioning feature 60*i*+2 of the third roller 22*i*+2 is facing the angular visual positioning feature 18*a* of the nut 18, for example aligned and radially directed outwards, as can be seen in FIG. 6.

The steps of placement and rotation of the rollers 22 are repeated for each roller.

Thus, by virtue of the angular visual positioning feature, both on the rollers 22 and on the nut 18, it is possible to fit the rollers 22 in the nut 18 in a single fitting operation.

As illustrated in the figures, the rollers are positioned in such a way that the angular visual positioning feature 60 are each time aligned with the angular visual positioning feature 18*a* of the nut 18 directed radially outwards. As a variant, the position of the angular visual positioning feature 60 relative to the angular visual positioning feature 18*a* of the nut 18 could be defined in any other way. For example, the angular visual positioning feature 60 can be, each time, aligned with the angular visual positioning feature 18*a* of the nut 18, but radially directed inwards, or form an angle with the angular visual positioning feature 18*a* of the nut 18.

Figure 7:
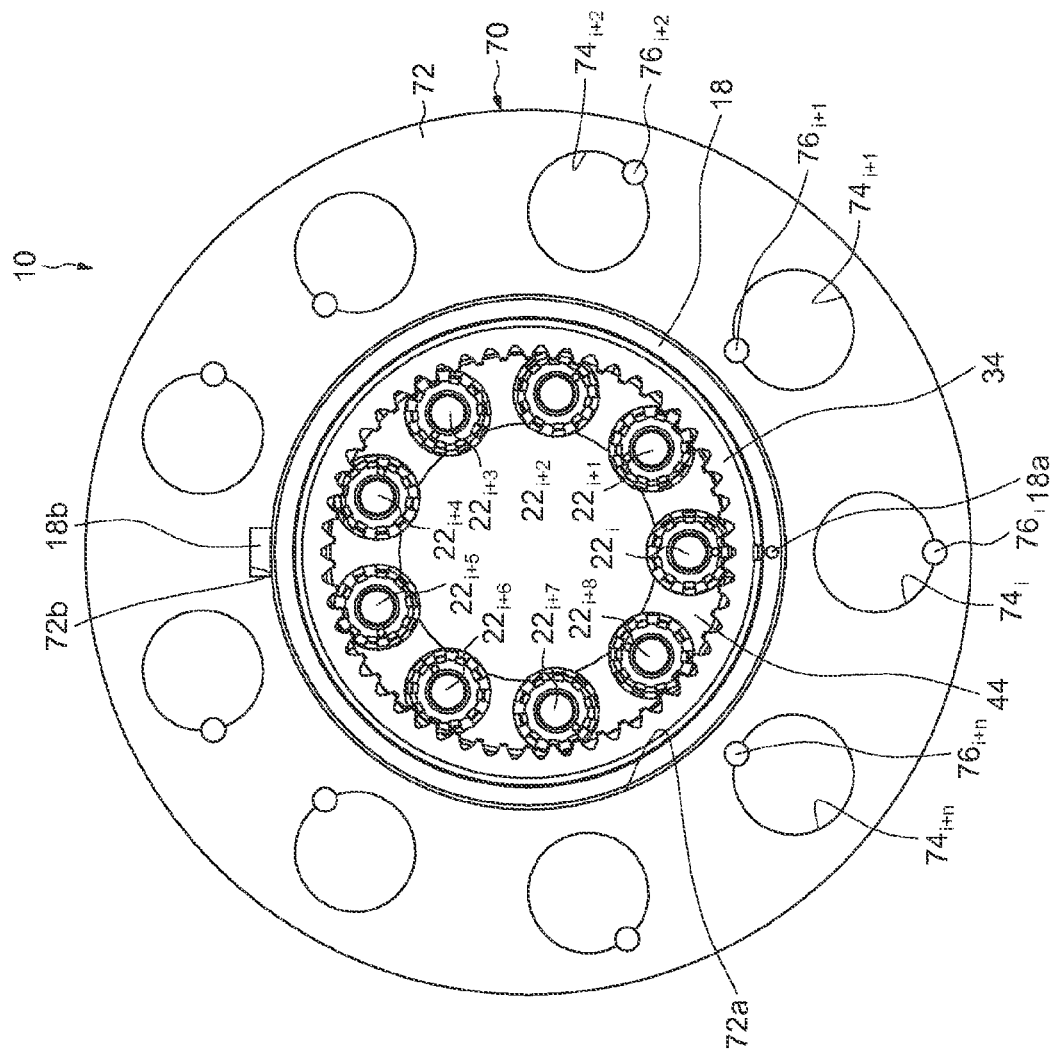
FIG. 7 is a front view of a tool for fitting rollers in the roller screw mechanism of FIG. 1.

The embodiment illustrated in FIG. 7, in which the identical elements bear the same references, differs from the embodiment illustrated in FIGS. 4 to 6 by the fact that a fitting tool 70 is used in order to fit the rollers 22 in the crown ring 34 of the roller screw mechanism 10.

The fitting tool 70 comprises an annular body 72 comprising a cylindrical through piercing 72*a* having an inner diameter greater than the outer diameter of the nut 18 and a plurality of cylindrical through voids 74*i* distributed evenly in the circumferential direction, i being the number of cylindrical through voids 74 corresponding to the number of rollers 22, between 1 and n. The fitting tool 70 comprises, level with each cylindrical void 74, an angular visual positioning feature 76*i* for each of the rollers 22.

The fitting tool 70 comprises, on its cylindrical piercing 72*a*, a notch 72*b* intended to cooperate with a ridge 18*b* formed on the outer cylindrical surface (not referenced) of the nut 18 and that can be seen in FIG. 7. As a variant, a key could be provided instead of a ridge. The cooperation of the ridge 18*b* of the nut 18 with the groove 72*b* of the fitting tool 70 makes it possible to angularly position the fitting tool 70 relative to the nut 18, in such a way that the angular visual positioning feature 18*a* of the nut 18 is aligned with the angular visual positioning feature 76*i* of the first void 74*i* of the fitting tool 70.

The rollers 22 are fitted in the crown ring 34 as follows:

A first roller 22*i* is positioned manually or automatically in the associated void 45*i* of the annular ring referenced 44 so that the angular visual positioning feature 60 of the first roller 22*i* is aligned with the angular visual positioning feature 18*a* of the nut 18, i being the number of rollers 22 and of voids 45, between 1 and n.

Once the first roller 22*i* is fitted in the crown ring 34, the fitting tool 70 is positioned around the nut 18 in such a way that the notch 72*b* cooperates with the ridge 18*b* of the nut 18. Thus, the angular visual positioning feature 76*i* of the fitting tool 70 is in the same angular position as the angular visual positioning feature 60*i* of the first roller 22*i* and as the angular visual positioning feature 18*a* of the nut 18. All the other rollers 22*n* are then positioned in the angular positions corresponding to the angular positions of the angular visual positioning feature 76*i* of the fitting tool 70.

By virtue of the invention, it is possible to easily fit the rollers in the nut by virtue of the angular visual positioning feature formed on each of the rollers and on the nut.

A fitting method is thus obtained that allows for an easy and automatic indexing of the rollers in the nut.

The invention claimed is:

1. A roller screw mechanism comprising:
    a screw having an outer threading;
    a nut arranged around and coaxially to the screw, the nut having an inner threading; and
    a plurality of mutually identical rollers interposed between the screw and the nut,
    each mutually identical roller having an outer threading engaged with the outer and inner threadings of the screw and of the nut, the threading of each roller being prolonged axially at each end by teeth which are themselves prolonged axially by a cylindrical journal extending outwards,
    the roller screw mechanism further comprising two annular crown rings fixed in an unthreaded part of the bore of the nut and each internally comprising teeth respectively engaged with the teeth of the rollers and two annular rings each fitted radially between the screw and the associated crown ring and comprising a plurality of cylindrical through voids distributed evenly in the circumferential direction and inside which the journals of the rollers are housed,
    wherein each of the rollers comprises an angular visual positioning feature and the nut comprises an angular visual positioning feature making it possible to angularly place the rollers in the crown ring.

2. The roller screw mechanism according to claim 1, wherein the angular visual positioning feature of the rollers is produced outside the threading.

3. The roller screw mechanism according to claim 2, wherein the angular visual positioning feature of the rollers is produced on one of the lateral radial surface or the cylindrical axial surface of one of the sets of teeth.

4. The roller screw mechanism according to claim 1, wherein the angular visual positioning feature of the rollers is produced on one of the lateral radial surface or the cylindrical axial surface of one of the journals.

5. The roller screw mechanism according to claim 1, wherein the angular visual positioning feature of the nut is produced on the lateral radial surface of the nut.

6. The roller screw mechanism according to claim 1, wherein the angular visual positioning feature is one of a deformation, a machining, or a marking.

7. The roller screw mechanism according to claim 1, wherein the angular visual positioning feature of the rollers is produced before the threading of the roller.

8. A fitting tool adapted for fitting rollers in a roller screw mechanism, the roller screw mechanism comprising:
a screw having an outer threading;
a nut arranged around and coaxially to the screw, the nut having an inner threading; and
a plurality of mutually identical rollers interposed between the screw and the nut and each having an outer threading engaged with the outer and inner threadings of the screw and of the nut, the threading of each roller being prolonged axially at each end by teeth which are themselves prolonged axially by a cylindrical journal extending outwards,
the roller screw mechanism further comprising two annular crown rings fixed in an unthreaded part of the bore of the nut and each internally comprising teeth respectively engaged with the teeth of the rollers and two annular rings each fitted radially between the screw and the associated crown ring and comprising a plurality of cylindrical through voids distributed evenly in a circumferential direction and inside which the journals of the rollers are housed,
wherein each of the rollers comprises an angular visual positioning feature and the nut comprises an angular visual positioning feature making it possible to angularly place the rollers in the crown ring; and
the fitting tool comprising:
an annular body having a cylindrical through piercing having an inner diameter greater than an outer diameter of the nut and a plurality of cylindrical through voids distributed evenly in the circumferential direction and each having an angular visual positioning feature for each of the rollers,
a notch, formed on the cylindrical piercing, intended to cooperate with a ridge of the nut in order to angularly position the fitting tool relative to the nut.

9. A method for fitting rollers in a roller screw mechanism, the roller screw mechanism comprising:
a screw having an outer threading;
a nut arranged around and coaxially to the screw, the nut having an inner threading; and
a plurality of mutually identical rollers interposed between the screw and the nut and each having an outer threading engaged with the outer and inner threadings of the screw and of the nut, the threading of each roller being prolonged axially at each end by teeth which are themselves prolonged axially by a cylindrical journal extending outwards,
the roller screw mechanism further comprising two annular crown rings fixed in an unthreaded part of the bore of the nut and each internally comprising teeth respectively engaged with the teeth of the rollers and two annular rings each fitted radially between the screw and the associated crown ring and comprising a plurality of cylindrical through voids distributed evenly in the circumferential direction and inside which the journals of the rollers are housed,
wherein each of the rollers comprises an angular visual positioning feature and the nut comprises an angular visual positioning feature making it possible to angularly place the rollers in the crown ring,
the method comprising steps of:
positioning the first roller in the associated void of one of the annular rings so that the angular visual positioning feature of the first roller is aligned with the angular visual positioning feature of the nut; and
turning the first roller on itself until the adjacent void formed in the annular ring is level with the angular visual positioning feature of the nut.

10. The method for fitting rollers in a roller screw mechanism according to claim 9, the method further comprising steps of
positioning a second roller in the associated void of the annular ring so that the angular visual positioning feature of the second roller is aligned with the angular visual positioning feature of the nut; and
turning the second roller on itself until the adjacent void formed in the annular ring is level with the angular visual positioning feature of the nut and
repeating the step of placement and rotation for each of the rollers.

11. The method for fitting rollers in a roller screw mechanism according to claim 9, wherein, after having fitted the first roller in the crown ring, the fitting tool is positioned around the nut in such a way that the notch cooperates with the ridge of the nut and all the other rollers are positioned in the angular positions corresponding to the angular positions of the angular visual positioning feature of the fitting tool.

* * * * *